Jan. 30, 1940.　　　　H. V. ATWELL　　　　2,188,638
CONVERSION OF HYDROCARBONS
Filed May 11, 1937
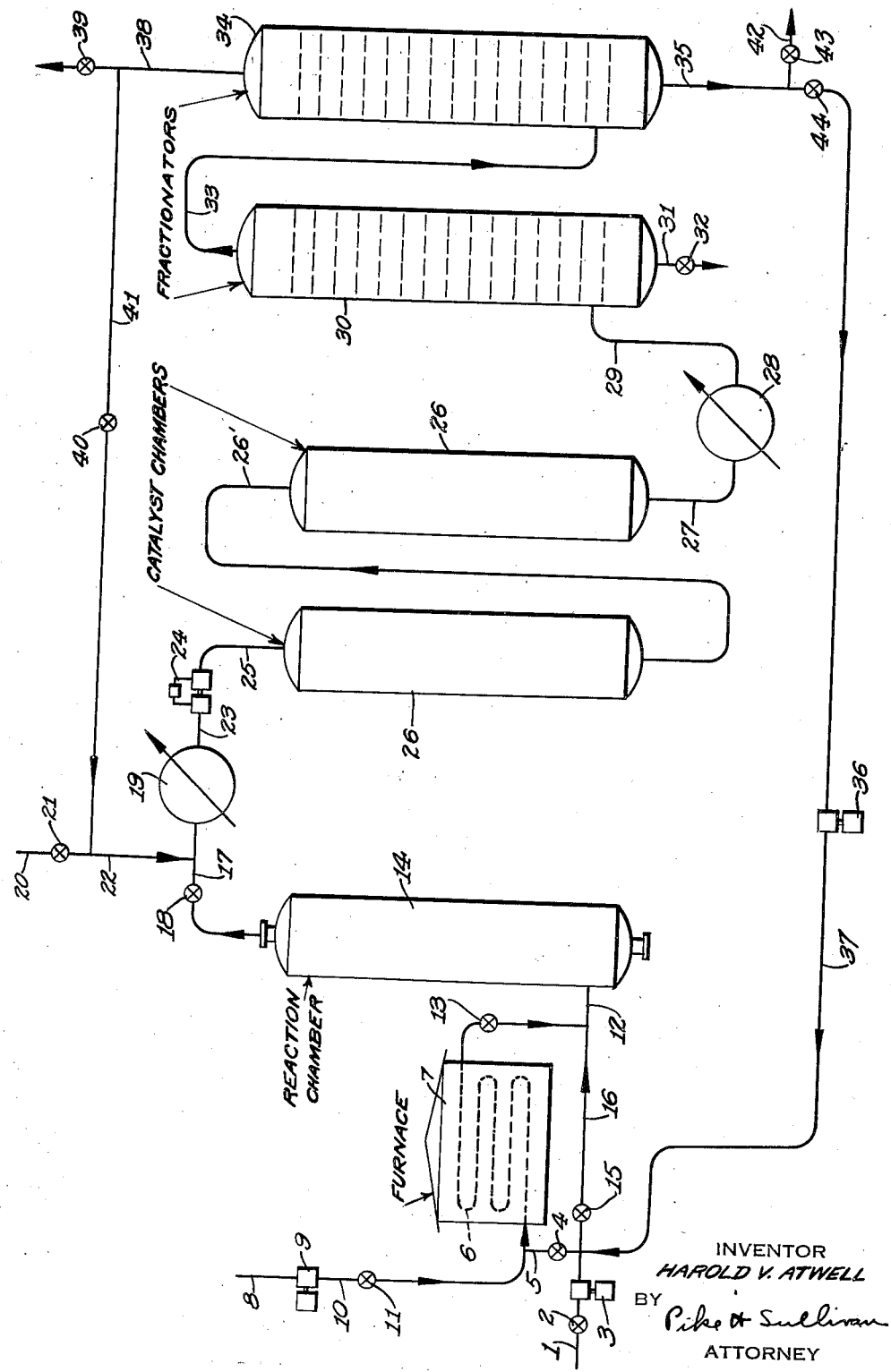
INVENTOR
HAROLD V. ATWELL
BY Pike & Sullivan
ATTORNEY Patented Jan. 30, 1940

2,188,638

UNITED STATES PATENT OFFICE 2,188,638

CONVERSION OF HYDROCARBONS

Harold V. Atwell, White Plains, N. Y., assignor to Process Management Company, Inc., New York, N. Y., a corporation of Delaware Application May 11, 1937, Serial No. 141,899

1 Claim. (Cl. 196—10)

My invention relates in general to the conversion of normally gaseous hydrocarbons and more particularly to a unitary process for the production of normally liquid hydrocarbons suitable for use as motor fuel.

My invention contemplates the conversion in a continuous stream, of normally gaseous hydrocarbons consisting predominantly of saturated hydrocarbons, wherein the normally gaseous hydrocarbons are subjected to controlled oxidation in the presence of an oxygen-containing gas to form substantial quantities of normally gaseous olefins, water vapor and inert gas, all of which products are conducted to a catalytic polymerization zone where they are subjected to conditions of catalytic polymerization in the presence of an active polymerization catalyst to effect the polymerization of normally gaseous olefins in the presence of the inert gas and the water vapor. An inordinate rise in temperature of the catalytic surface and the resultant dehydration of the catalyst is avoided in the continuous conversion operation because of the presence of the inert gas and water vapor in the products of the controlled oxidation phase of the process.

In accordance with the present invention, normally gaseous hydrocarbon gases consisting essentially or principally of saturated hydrocarbons, such as natural gas, or such as obtained, for example, from the cracking of hydrocarbon fluids, are preheated to a temperature sufficiently high to initiate the controlled oxidation reaction in the presence of controlled amounts of an oxygen-containing gas, for example air or an oxide of nitrogen such as $NO_2$ capable of yielding substantial quantities of an inert gas, and the preheated gases are passed into a reaction zone, such as an enlarged reaction chamber, wherein the controlled oxidation reaction takes place. The oxygen-containing gas is added in quantities which are sufficient to effect the dehydrogenation reaction but insufficient to effect complete oxidation of the saturated hydrocarbons, thereby forming substantial quantities of unsaturated hydrocarbons, inert gas and water vapor. The reaction products leaving the dehydrogenation zone are cooled to a temperature favorable to the catalytic polymerization reaction and are subjected to catalytic polymerization in the presence of an active polymerization catalyst, for example phosphoric acid, aluminum chloride, alumina on silica, etc., whereby normally gaseous olefins are converted to normally liquid hydrocarbons. In subjecting the unsaturated hydrocarbons resulting from the controlled oxidation to catalytic polymerization in the presence of all of the products resulting from the controlled oxidation reaction, accumulation of the exothermic heat of polymerization and the resultant dehydration and exhaustion of the polymerization catalyst is prevented due to the presence of inert gas and water vapor inherent in the products of the controlled oxidation reaction. Since the content of inert gas and water vapor in the system is determined by the quantity of air admitted to the oxidation zone, the permissible operating temperature of the surface of the polymerization catalyst can be controlled to a large degree by judicious control of the quantity of air added to the oxidation zone. Although it is my intention to restrict the oxidation reaction to one of partial dehydrogenation, small amounts of alkyl-oxides resulting from side reactions will be produced. This is regarded as an advantage to my process because of the promoting effect these oxides exert upon the subsequent polymerization reaction.

Reaction products leaving the polymerization zone are subjected to fractionation to separate a normally liquid hydrocarbon fraction suitable for use as motor fuel. The remaining reaction products are further fractionated to separate a normally gaseous fraction predominating in $C_3$ and $C_4$ hydrocarbons, which is conducted to the dehydrogenating or controlled oxidation zone.

The invention will be more fully understood from the following description read in connection with the accompanying drawing which shows diagrammatically an elevation of one form of apparatus for carrying out the process of the invention.

Referring to the drawing, the charging stock, which may be natural gas, or a normally gaseous hydrocarbon fraction containing a large proportion of normally gaseous saturated hydrocarbons having at least two carbon atoms to the molecule, such as obtained in the stabilization of natural gasoline or resulting from the cracking of hydrocarbon fluids is drawn from a source of supply, not shown, through line 1, controlled by valve 2, and forced by the pump 3 through line 5, regulated by valve 4, to the heating coil 6 in a furnace 7. An oxygen-containing gas, for example air, is drawn from an outside source through line 8 and forced by pump 9 through line 10, controlled by valve 11, into line 5 wherein it commingles with the charge entering preheating coil 6 in furnace 7. In coil 6 the hydrocarbon gases in admixture with the controlled amounts of the oxygen-containing gas are brought to a temperature of 600–1400° F. and preferably about 1200 to 1300° F. While the coil 6 may be operated under any desired pressure I have found that a low pressure of from slightly above atmospheric to about 100 pounds is to be preferred. The preheated gaseous mixture leaving coil 6 is passed through line 12 controlled by valve 13 into the enlarged reaction chamber 14 wherein partial dehydrogenation of the charge takes place. Although I have selected air as a preferred agent for carrying out the primary step of the process, the invention is in no wise limited to the use of this gas. When air is used it may be enriched with oxygen above the normal content of air, or the oxygen content may be lowered by dilution with an inert gas or by any other suitable means. Other oxygen-containing gases capable of liberating required quantities of inert gas during the subsequent reaction may suitably be used; for example, an oxide of nitrogen such as $NO_2$. The oxygen-containing gas is added in carefully controlled amounts to effect partial dehydrogenation of the charge in reaction chamber 14 and yet avoid complete oxidation of the charge. Although in the present example describing my invention, the dehydrogenation reaction will be initiated to a certain extent in coil 6 and completed in the enlarged reaction chamber 14, it should be understood that the invention is not limited to the use of a reaction chamber for this phase of the reaction and that the dehydrogenation reaction may be completed in a coil instead; furthermore, if desired, the dehydrogenation reaction may be initiated and completed in a single coil. When proper operating conditions are maintained in chamber 14 a partial dehydrogenation of a substantial portion of the saturated charge will take place with the formation of unsaturated hydrocarbons having essentially the same number of carbon atoms to the molecule as the charge. Although the exact nature of the reaction favored in the reaction zone 14 is not readily determined, it is believed to be a simple breaking of hydrogen-to-carbon links, with the resultant formation of an unsaturate, a water molecule and residual inert gas from the oxygen-containing gas added. It is not my intention, however, to limit the controlled oxidation phase of my process to this type of reaction. Conditions of operation may well result in more complicated reactions and the formation of normally gaseous unsaturates having either more or less carbon atoms to the molecule than the hydrocarbon gases charged to the system. Operating conditions vary to a certain degree with composition of the charge, severer conditions being required with an increase in proportion of the light hydrocarbon constituents in the charge. A preferred type of operation would be to maintain the reaction chamber under a low pressure preferably substantially atmospheric. The temperature may range from 700 to 1500° F. and preferably about 1300° F. Addition of controlled amounts of air is made in such quantities that there will be at least 30% by volume and no more than 80% by volume, and preferably about 55% by volume of air in the mixture entering reaction chamber 14. If an oxygen-containing gas other than air is used, controlled additions of this gas should be made to insure an equivalent oxygen content in the mixture entering the reaction chamber 14.

Once controlled oxidation has been initiated the exothermic heat of the reaction may aid materially in maintaining the desired equilibrium conditions in chamber 14. A line 16, controlled by valve 15, branches off from line 5 and by-passing furnace 7 leads to line 12 entering reaction chamber 14. By suitable manipulation of valves 4, 13 and 15, a part of the charge may by-pass the preheating coil 6 whereby a desired portion of the charge will flow through line 16 controlled by valve 15 into transfer line 12 in order to closely control the composition of the charge to the reaction chamber and the temperature therein. Reaction products comprising unsaturated hydrocarbons, water vapor, nitrogen, small amounts of oxygenated compounds and unconverted charge, are conducted from the reaction chamber 14 through line 17 controlled by valve 18 to a heat exchanger 19 wherein the products of controlled oxidation are subjected to indirect heat exchange with a cooling medium which may suitably be the fresh charge to the system. Additional cooling means of indirect exchange not shown in the drawing may be resorted to if necessary. Inert gas, or water vapor, or unsaturated hydrocarbons or a suitable mixture of any two or all of these may be passed through line 20 controlled by valve 21 from an outside source, not shown, through line 22 and discharged directly into line 17 for the purpose of additional cooling and additional control, if desired, of conditions in the subsequent phase of the process hereinafter described in detail. The temperature of the products of dehydrogenation leaving exchanger 19 will have been reduced to 200–500° F., preferably 300–400° F., and are conducted through line 23 to compressor 24 wherein the stream is brought to a pressure of 50 to 500 pounds and preferably about 100 to 200 pounds, and conducted through line 25 to catalytic polymerization chambers 26. Line 25 enters the top of one of two catalytic polymerization chambers. The stream of gases and vapors flowing downward through the first polymerization chamber is withdrawn from the bottom thereof and conducted through line 26' to the top of the second chamber. Although the catalyst chambers in the illustrative description of my process are shown to be two in number and connected in series, it is to be understood that my invention is not limited to any specific number of catalyst chambers nor is it restricted to the series arrangement shown. A preferred arrangement would be the use of a plurality of catalytic polymerization chambers of which a single chamber or several chambers, connected in parallel or in series as shown are used in rotation.

In the catalytic polymerization chambers 26 the products are contacted with an active polymerization catalyst such as phosphoric acid. Ordinarily this catalyst is in a solid state, such as a mixture of phosphoric acid and fullers earth, suitably disposed in the chamber to effect intimate contact between the gases and the catalyst. While phosphoric acid is preferred, it is to be understood that other polymerizing catalysts such as aluminum chloride, sodium aluminum chloride, alumina on silica, sulfuric acid, or similar catalysts may be used. It is intended that in the polymerizing zone 26 a major portion of the unsaturated or olefin hydrocarbons be polymerized to normally liquid hydrocarbons, preferably within the gasoline boiling range. The catalytic polymerization phase of the operation is effected at a temperature of 300–600° F. and preferably about 400–500° F. and at a pressure of 50 to 500 pounds, preferably about 100–200 pounds. The desired conditions of temperature and pressure in the catalytic polymerization zone 26 are maintained by judicious control of the cooling effected in exchanger 19 and regulation of compressor 24. Ordinarily smooth operation of this phase of my process will be assured by the presence of water vapor inherent in the products of controlled oxidation which prevents dehydration of the catalyst. Inert gas, also inherent in the products of controlled oxidation, by absorbing the exothermic heat of the polymerization reaction will aid materially in preventing overheating of the catalyst surface. The quantities of inert gas and water vapor in the reaction products entering the catalytic chambers 26 and therefore the permissible conditions of the polymerization catalyst can be controlled by judicious regulation of the quantity of air admitted through line 10 into coil 6 while still remaining within the desired limits set for the dehydrogenation reaction.

Polymerization products leave the second chamber of the catalytic polymerization chambers 26 through line 27 and pass through the heat exchanger 28, wherein they may be cooled if so desired, and are thence passed through line 29 to fractionator 30 wherein the products are fractionated to separate a normally liquid fraction consisting of hydrocarbons boiling within the gasoline boiling range and water, which is drawn from the bottom of fractionator 30 through line 31 controlled by valve 32 and eliminated from the system as the final product. The remaining normally gaseous reaction products are conducted from the top of fractionator 30, through line 33 to fractionator 34 wherein a normally gaseous fraction predominating in C3 and C4 hydrocarbons is condensed and separated from the remaining gaseous products and withdrawn through line 35 controlled by valve 44 and recycled by pump 36 through line 37 to join the fresh charge entering the system. All or any part of the normally gaseous hydrocarbons condensed in fractionator 34 and withdrawn therefrom through line 35 may, by suitable manipulation of valves 44 and 43, be withdrawn from the system through line 42. If desired, operation of fractionator 34 may be carried on in such a manner that any part or substantially all of the C2 hydrocarbons are condensed and separated together with the fraction predominating in C3 and C4 hydrocarbons. Remaining gaseous products comprising hydrogen, nitrogen, and hydrocarbons of essentially less than two or three carbon atoms per molecule leave fractionator 34 through line 38 controlled by valve 39 and are eliminated from the system. By regulation of valves 39 and 40 all or any part of the gases leaving fractionator 34 may, if desired, be passed through line 41 and into line 22 wherein they may optionally be mixed with inert material from an outside source, referred to above, before being discharged into the products of controlled oxidation entering exchanger 19, to thereby assist in cooling the controlled oxidation products and in maintaining the operating conditions of the catalytic material in chambers 26.

As an example of the operation of the invention, a gas consisting predominantly of propane mixed with an equal volume of air and heated to 1300° F. in coil 6 is passed into the enlarged reaction chamber 14 wherein it is maintained at this temperature and substantially atmospheric pressure. The resulting products in passing through condenser 19 are cooled to 300° F., and are subsequently compressed to 150 pounds by compressor 24 and subjected to catalytic polymerization in chambers 26 in the presence of a phosphoric acid catalyst. The products leaving the polymerization chambers 26 are fractionated in fractionator 30 whereby the normally liquid polymers and water vapor are condensed and withdrawn through line 31. By such operation with recycling of unconverted gases approximately 70% of the normally gaseous hydrocarbons charged is concerted ultimately into liquid polymers within the gasoline boiling range having an octane number of 80 to 85.

Many modifications and variations of the invention as herein set forth may be made without departing from the spirit and scope thereof and therefore only such limitations should be imposed as are indicated in the appended claim.

I claim:

The method of converting normally gaseous hydrocarbons to normally liquid products by contact thereof at elevated temperature with a polymerization catalyst whose activity is impaired by dehydration and overheating which comprises mixing a gas consisting essentially of saturated hydrocarbons and predominating in hydrocarbons having more than two carbon atoms per molecule with an oxygen-containing gas in an amount sufficient to effect substantial dehydrogenation of said saturated hydrocarbons but insufficient to effect complete oxidation of said gas, thereafter heating the resulting mixture to elevated temperature to initiate and carry to completion the dehydrogenation reaction of said oxygen and said saturated gases to effect the formation therein of a substantial proportion of normally gaseous unsaturated hydrocarbons and inert gaseous reaction products including steam, cooling said reaction products to a temperature not substantially greater than 500° F., thereafter passing all the said products of said dehydrogenation treatment together with unconverted constituents into contact at elevated temperature not substantially greater than 600° F. with said polymerization catalyst whose activity is impaired by dehydration and overheating to effect conversion of unsaturated hydrocarbons to normally liquid products.

HAROLD V. ATWELL.